United States Patent [19]

Bradley

[11] Patent Number: 5,433,566
[45] Date of Patent: Jul. 18, 1995

[54] TAILGATE-MOUNTED STABILIZING APPARATUS

[76] Inventor: Douglas B. Bradley, Blue Ridge Assembly Dr., P.O. Box 172, Montreat, N.C. 28757

[21] Appl. No.: 336,548

[22] Filed: Nov. 9, 1994

Related U.S. Application Data

[63] Continuation-in-part of Ser. No. 96,872, Jul. 26, 1993, abandoned.

[51] Int. Cl.⁶ ............................................. B62D 25/00
[52] U.S. Cl. .................................. 410/121; 296/57.1; 224/323; 410/106
[58] Field of Search ....................... 410/31, 32, 33, 34, 410/35, 36, 37, 38, 39, 40, 106, 120, 121, 127, 128, 143, 144, 145, 146, 147, 148, 149, 151, 156; 224/323, 322, 310, 311, 309, 329; 296/57.1

[56] References Cited

U.S. PATENT DOCUMENTS

| | | | |
|---|---|---|---|
| 3,381,866 | 5/1968 | Wickett | 224/322 X |
| 4,121,849 | 10/1978 | Christopher | 410/38 |
| 4,343,578 | 8/1982 | Barnes | 410/143 X |
| 4,389,067 | 6/1983 | Rubio | 224/310 X |
| 4,527,827 | 7/1985 | Maniscalco et al. | 224/311 X |
| 4,705,198 | 11/1987 | Kamaya | 224/322 X |
| 4,772,165 | 9/1988 | Bartkus | 410/145 X |
| 4,938,403 | 7/1990 | Cortelli | 410/142 X |
| 5,082,404 | 1/1992 | Stewart et al. | 410/127 |
| 5,169,202 | 12/1992 | Cupp et al. | 296/57.1 X |
| 5,197,642 | 3/1993 | Cortelli | 410/106 X |

*Primary Examiner*—Frank E. Werner
*Assistant Examiner*—James Eller
*Attorney, Agent, or Firm*—Carter & Schnedler

[57] ABSTRACT

Tailgate-mounted apparatus for stabilizing loads being carried in or supported by a pickup truck in a variety of configurations. The apparatus includes a bar and a pair of end supports for the bar mounted to the tailgate inside surface adjacent tailgate side edges and near the tailgate upper edge. The bar is detachably mounted to the end supports, and extends along the tailgate inside surface in spaced relationship thereto generally between the side edges. A pair of article clamping elements, which generally resemble bookends, are slidably attached to the bar and provided with locking devices for selectively securing the article clamping elements at various positions along the bar. In one position, typically employed when the tailgate is in its horizontal lowered position, the clamping elements extend generally perpendicular to the tailgate surface and upwardly for stabilizing articles supported by the bed and by the bar. This position is useful for carrying articles, as well as for stabilizing material in place when the pickup truck bed and tailgate are employed as a work bench. In another position, generally useful when the tailgate is in its vertical latched position, the clamping elements extend generally parallel to the tailgate inside surface and upwardly past the tailgate upper edge for stabilizing articles supported by the upper edge. There also is a stowage position, in which the clamping elements extend generally parallel to the tailgate inside surface in a direction away from the distal edge.

15 Claims, 3 Drawing Sheets

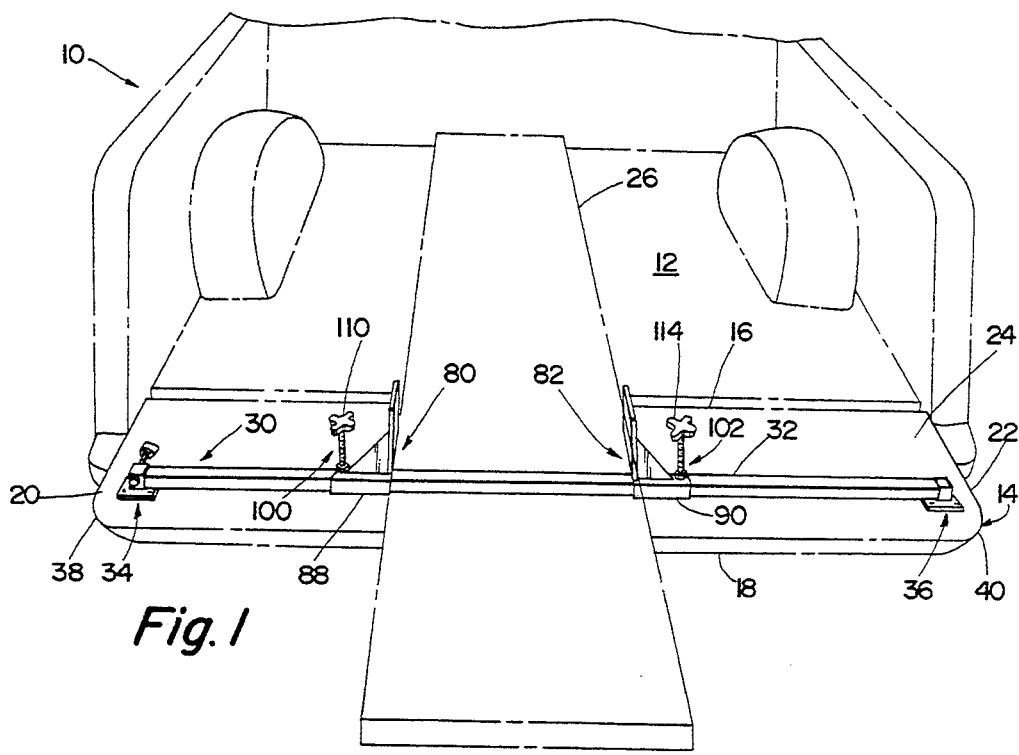
Fig. 1
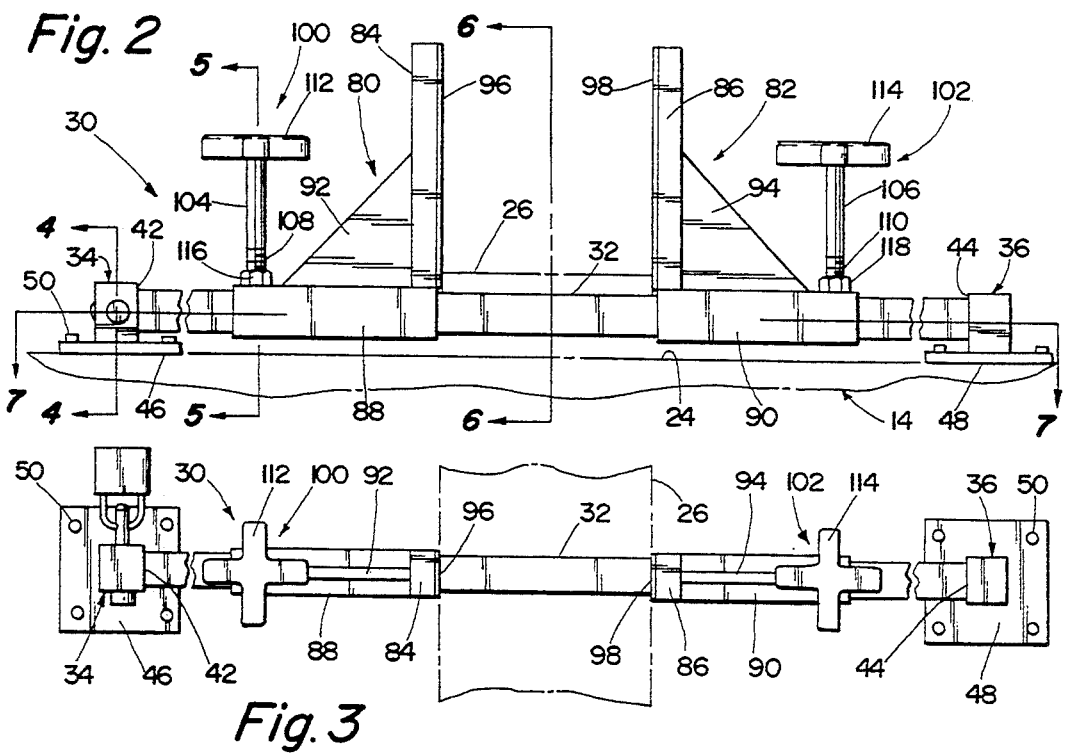
Fig. 2
Fig. 3

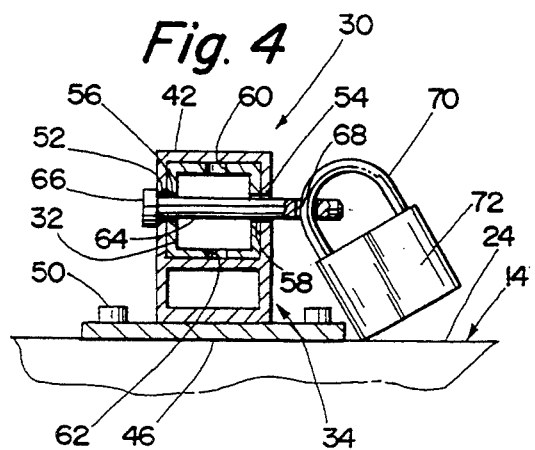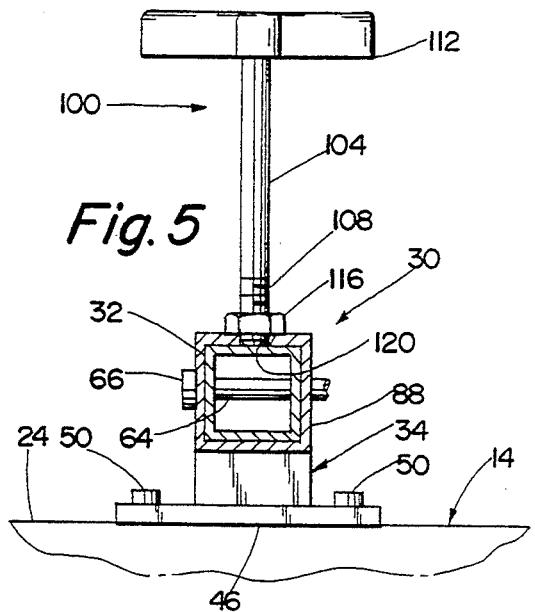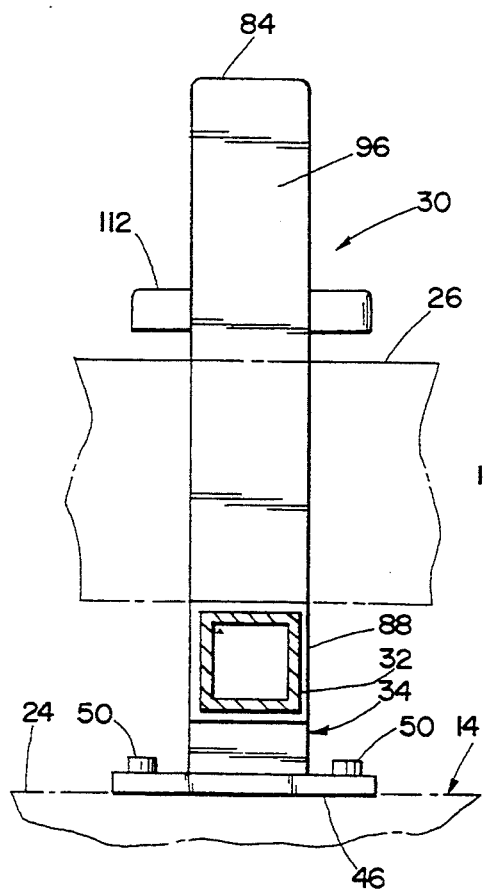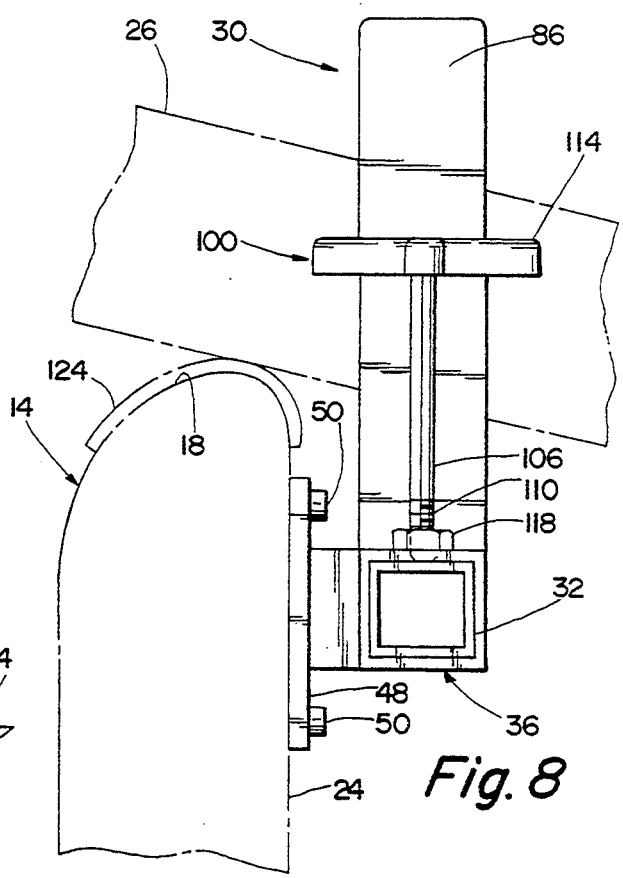

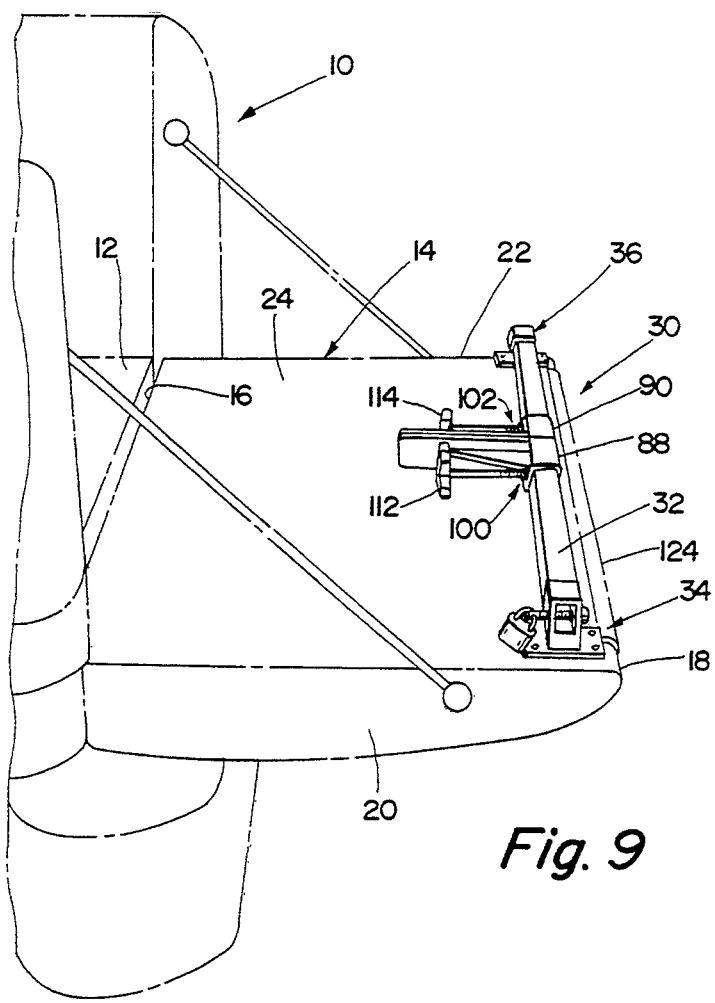
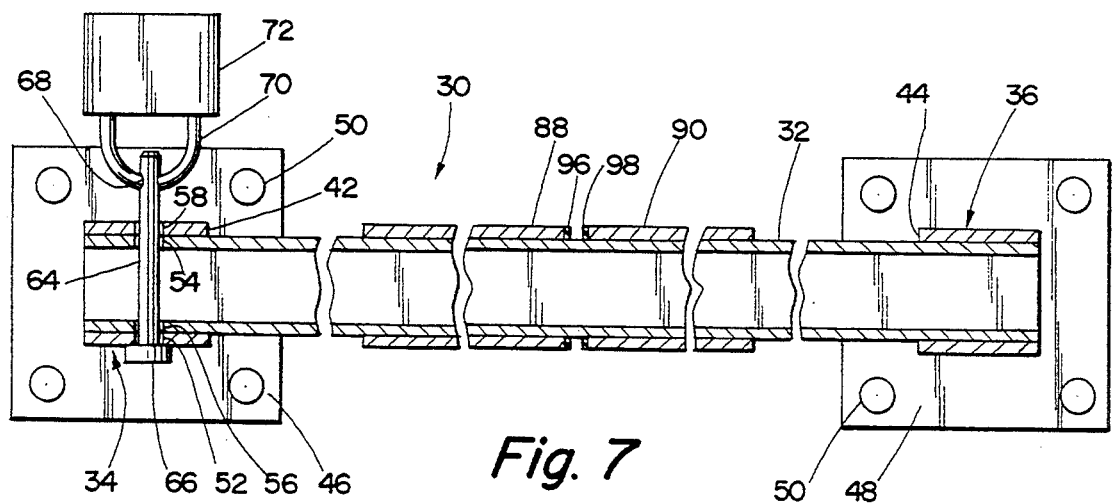

TAILGATE-MOUNTED STABILIZING APPARATUS

CROSS-REFERENCE TO RELATED APPLICATION

This is a continuation-in-part of application Ser. No. 08/096,872, filed Jul. 26, 1993, and now abandoned.

BACKGROUND OF THE INVENTION

The present invention relates to apparatus for stabilizing articles being carried in a pickup truck.

As is well known, pickup trucks are working vehicles employed for transporting a wide variety of articles and materials, and of widely varying configurations. Examples include lumber; round or tubular articles such as poles, electrical conduit; pipes; ladders; and power-operated equipment with handles, such as mowers. In addition to transporting loads, pickup trucks, when parked at work sites, are sometimes employed, with the tailgate down, as work benches, since they provide a stable surface at a convenient height.

A common problem when carrying cargo is shifting of the cargo, which can cause damage to the cargo as well as the pickup truck itself. While such is a particular problem with tubular items, a wide variety of loads are subject to shifting during transport.

Accordingly, various solutions have been proposed in the prior art. Examples include the systems of Barnes U.S. Pat. No. 4,343,578 and Bartkus U.S. Pat. No. 4,772,165, which employ adjustable cross members within the bed of a pickup truck for load stabilizing and restraining purposes. The systems of these two patents are generally intended for stabilizing relatively compact, upright loads which sit within the bed of the pickup truck. While likely effective for such purposes, the systems of the Barnes and Bartkus patents are fairly specialized for their intended loads, and relatively complex. Another disadvantage is that the stabilizing systems, if left installed, tend to interfere with other uses of the pickup truck.

As another example, Christopher U.S. Pat. No. 4,121,849 discloses a rather different form of stabilizer for articles carried within a pickup truck bed, particularly long articles such as lumber which may extend past the end of the bed, with the tailgate down or removed. Christopher thus employs a transverse member extending across the truck bed near the front thereof, and pressing downwardly. The Christopher device likewise is relatively specialized, and somewhat complex.

SUMMARY OF THE INVENTION

In view of the foregoing, it is an object of the invention to provide stabilizing apparatus to facilitate the safe transportation of a variety of awkward loads in a pickup truck.

It is yet another object of the invention to provide stabilizing apparatus which may also be usefully employed when the pickup truck is stationary to facilitate the use of the pickup truck as a sawhorse or work bench.

It is yet another object of the invention to provide such stabilizing apparatus which is relatively simple in configuration and inexpensive to manufacture, and which at the same time is highly effective.

It is yet another object of the invention to provide such apparatus which is relatively compact and which may be conveniently carried by the pickup truck with minimal interference to other uses of the pickup truck when the stabilizing apparatus is not being employed.

It is a related object of the invention to provide such apparatus which is conveniently and safely stowed out of the way when not being used.

Very briefly and in overview, the present invention provides stabilizing apparatus which is attached to the tailgate of a pickup truck and, when so attached, accordingly defines a combination with the pickup truck. The tailgate is hinged and selectively positionable in either a horizontal lowered position or a vertical latched position. In addition, the tailgate-mounted stabilizing apparatus of the invention itself has several positional configurations which, in combination with the two tailgate positions, provides exceptional versatility.

More particularly, the tailgate has a hinged edge adjacent the pickup truck bed, a distal edge opposite the hinged edge, left and right side edges, and an inside surface. The inside surface faces the bed when in the vertical latched position, and defines an extension of the bed when in the horizontal lowered position.

The stabilizing apparatus of the invention more particularly comprises a bar, and a pair of end supports for the bar. Each of the end supports is mounted to the tailgate against the inside surface thereof adjacent respective side edges and adjacent the distal edge, that is, near the upper corners of the tailgate. Each of the end supports supports a respective end of the bar such that the bar extends along the tailgate inside surface in spaced relationship thereto generally between the side edges. Preferably, the bar is square in cross-section, and the end supports comprise square sockets.

For detachably securing the bar to the end supports, a removable pin is provided and received in apertures formed in at least one of the square sockets and the corresponding end of the bar.

Slidably attached to the bar are a pair of article clamping elements, generally resembling bookends, and including respective face elements extending perpendicularly to the bar. Locking devices are provided for selectively securing the article clamping elements at various positions along the bar.

The stabilizing apparatus is selectively configurable in several positions. In a first position, typically employed when the tailgate is in its horizontal lowered position, the face elements extend generally perpendicular to the tailgate surface and upwardly for stabilizing articles supported by the bed and by the bar. This position is useful for carrying articles, as well as for stabilizing material in place when the pickup truck bed and tailgate are employed as a work bench.

In a second position, generally useful when the tailgate is in its vertical latched position, the face elements extend generally parallel to the tailgate inside surface and upwardly past the tailgate distal edge for stabilizing articles supported by the distal edge. This configuration is mainly used for transport, and has the advantages that articles are effectively stabilized, and unlikely to fall out of the truck.

The third positional configuration is a stowage position, in which the face elements extend generally parallel to the tailgate inside surface in a direction away from the distal edge.

For achieving these various configurations, preferably the bar is repositionable within the square sockets at various rotational positions with reference to the longitudinal axis of the bar. To this end, at least one of the square sockets and the corresponding end of the bar have apertures positioned for receiving the pin in a plurality of rotational orientations of the bar.

BRIEF DESCRIPTION OF THE DRAWINGS

While the novel features are set forth with particularity in the appended claims, the invention, both as to organization and content, will be better understood and appreciated from the following detailed description, taken in conjunction with the drawings, in which:

FIG. 1 is a perspective rear view of a pickup truck bed with a tailgate in a horizontal lowered position and with the stabilizing apparatus of the invention in a first configuration attached to the tailgate and securing a board in place;

FIG. 2 is an enlarged side elevational view of the stabilizing apparatus of FIG. 1;

FIG. 3 is an enlarged plan view of the stabilizing apparatus of FIG. 1;

FIG. 4 is a view, partly in cross-section, taken on line 4—4 of FIG. 2;

FIG. 5 is a view, partly in cross-section, taken on line 5—5 of FIG. 2;

FIG. 6 is a view, partly in cross-section, taken on line 6—6 of FIG. 2;

FIG. 7 is a view, partly in cross-section, taken on line 7—7 of FIG. 2;

FIG. 8 depicts the stabilizing apparatus of the invention in a second configuration securing a load in place with the tailgate in its vertical latched position; and FIG. 9 depicts the stabilizing apparatus of the invention in a stowage configuration.

DETAILED DESCRIPTION

Referring initially to FIG. 1 for an overview, a pickup truck, generally designated 10, includes a bed 12 and a hinged tailgate 14, shown in FIG. 1 in its horizontal lowered position. (A portion of the tailgate 14 is shown in its vertical latched position in FIG. 8.)

As is conventional, the tailgate 14 has a hinged edge 16 adjacent the bed 12, a distal edge 18 opposite the hinged edge, left and right side edges 20 and 22, and an inside surface 24 which faces the bed 12 when the tailgate 14 is in its vertical latched position.

Either carried by the pickup truck 10 or supported by the pickup truck 10 (for example to facilitate sawing) is a load or article in the representative form of a board 26. It will be appreciated that the board 26 is representative of a variety of loads and articles which may be stabilized by the apparatus of the invention. The invention is particularly advantageous for carrying small loads of lumber; round or tubular articles such as poles, electrical conduit, and pipes; ladders; and power-operated equipment with handles, such as a mower. The invention can alternatively be employed in the first configuration of FIG. 1 with the tailgate 14 in its horizontal lowered position for supporting large articles being transported or to simply secure an article for sawing purposes while the truck 10 is stationary, or in the second configuration of FIG. 8 with the tailgate in its vertical latched position such that loads being transported are especially unlikely to fall out.

More particularly, stabilizing apparatus in accordance with the invention is generally designated 30, and includes a bar 32, for example of one inch square aluminum stock, having a length which is slightly less than the width of the tailgate 14. Left and right end supports for the bar 32 generally designated 34 and 36, are mountable to the tailgate 14 against the inside surface 24 thereof, adjacent the side edges 20 and 22, and adjacent the distal edge 18, generally near the upper corners 38 and 40 of the tailgate 14 (as defined when the tailgate 14 is in its vertical latched position). When mounted, the bar 32 extends along the tailgate 14 inside surface 12 in spaced relationship with the inside surface 34 generally between the left and right side edges 20 and 22, and within boundaries defined by the distal and side edges 18, 20 and 22.

Referring now, in addition to FIG. 1, to FIGS. 2–6, the end supports 34 and 36 in the illustrated embodiment comprise sockets 42 and 44, which preferably are open ended and square to match the square cross-section of the bar 32, which is thus received within the sockets 42 and 44. The sockets 42 and 44 are sized so as to suitably restrain the bar 32, and at the same time are sufficiently loose fitting so as to permit temporary removal and repositioning of the bar 32 for purposes of reconfiguration as is described in greater detail hereinbelow. The sockets 42 and 44 are welded to corresponding left and right base plates 46 and 48, which are in turn secured to the tailgate 14 by means of representative bolts 50.

Referring in particular to FIG. 4, for detachably securing the bar 32 within the end supports 34 and 36, at least one of the sockets 42 or 44, in this example the left socket 42, has a hole drilled transversely therethrough defining apertures 52 and 54. Correspondingly, at least one end of the bar 32 is drilled transversely once to form a first set of apertures 56 and 58, and drilled transversely again at right angles with reference to the first drilling to form a second set of apertures 60 and 62.

A fastening pin 64 is provided which is insertable through the apertures 52 and 54 in the socket 42 and through either the first set of apertures 56, 58 or the second set of apertures 60, 62 of the bar 32, depending upon the desired rotational orientation of the bar 32 with reference to its longitudinal axis. The fastening pin 64 at one end has an enlarged head 66 and, at its opposite end, an aperture 68 for receiving the shackle 70 of a padlock 72.

A pair of article clamping elements, generally designated 80 and 82, are slidably attached to the bar 32. More particularly, the clamping elements 80 and 82 resemble bookends, and have respective face elements 84 and 86 formed, for example, of one-quarter inch thick flat steel stock, seven inches tall, and one and one-quarter inches wide extending perpendicularly to the bar 32, and secured such as by welding to corresponding sliding sleeve elements 88 and 90 via corresponding triangular braces or gussets 92 and 94. The sleeves 88 and 90 are, for example, formed of one and one-eighth inch square steel stock, five inches long, and the triangular braces or gussets 92 and 94 are each, for example, three and one-half inches tall and three and one-half inches wide.

Preferably, the face elements 84 and 86 are provided with corresponding pads 96 and 98 for protective purposes and for enhancing frictional gripping forces. The pads 96 and 98 for example may comprise either rubber sheet stock or carpet material.

For selectively securing the clamping elements 80 and 82 at various positions along the bar 32, locking devices are provided, generally designated 100 and 102, which more particularly comprise friction clamps in the form of shafts 104 and 106 having threads 108 and 110 at their one ends and handles 112 and 114 at their other ends. The threads 108 and 110 are received by corresponding nuts 116 and 118 welded to the corresponding sleeves 88 and 90. Apertures are provided in the sleeves 88 and 90 in alignment with the nuts 116 and 118, such as the aperture 120 in sleeve 88 as may be seen in FIG. 5. The thread ends of the shafts 104 and 106 bear against the bar 32 when the locking devices 100 and 102 are tightened.

The sleeve elements 88 and 90 and thus the clamping elements 80 and 82 accordingly are generally free to slide along the bar 32 when the locking devices 100 and 102 are not tightened, and can be effectively locked in any suitable desired position by tightening the locking devices 100 and 102 by means of the handles 112 and 114. Although a preferred form of locking device 100, 102 is illustrated, it will be appreciated that a variety of alternative arrangements may be employed.

One of the features of the invention is that it is selectively configurable in several positions for different purposes. Thus, described hereinabove with reference to FIGS. 1–7 is the first position wherein the face elements 84 and 86 extend generally perpendicular to the tailgate surface 24 and thus upwardly for stabilizing articles supported by the bed 12 and the bar 32 when the tailgate 14 is in its horizontal lowered position. As noted hereinabove, this first configuration is useful either for carrying articles within the pickup truck 10, as well as when the pickup truck bed 12 and tailgate 14 are employed as a workbench for purposes such as sawing, whereby the clamping elements 80 and 82 function as convenient work supports in the manner of a saw horse or a work bench clamp. The material 26 thus is held firmly in place, with the weight thereof supported by the tailgate 14 and pickup truck bed 12.

The position or configuration is readily and conveniently changed by unlocking the padlock 72 and removing the fastening pin 64, thereby freeing the bar 32 for longitudinal movement within the sockets 42 and 44 of the end supports 34 and 36. As noted hereinabove, the relative sizes of the bar 32 and of the sockets 42, 44 provide a sufficiently loose fit so that the bar 32, with clamping elements 80 and 82 still attached, can be temporarily removed from the end supports 34 and 36, rotated about the longitudinal axis of the bar 32, and reinstalled within the end supports 34 and 36.

As noted hereinabove, with particular reference to FIG. 4, in cooperation with the apertures 52, 54 in the socket 42, one end of the bar 32 is provided with a first set of apertures 56, 58 and a second set of apertures 60, 62 drilled at right angles through which the fastening pin 64 may be inserted so as to secure the bar 32 in various rotational orientations with reference to its longitudinal axis. With the square bar 32 of the preferred embodiment, in theory there are four such orientations, but one of these theoretical orientations is not usable because it would correspond with the clamping elements 80 and 82 facing downwardly into the body of the tailgate 14.

Of the three remaining and usable positions, it will be appreciated that one is the first position described hereinabove with particular reference to FIGS. 1–6.

FIG. 8, briefly referred to hereinabove, shows the stabilizing apparatus 30 of the invention in its second positional configuration, useful when the tailgate 14 is in its vertical latched position. The representative load 26 is generally supported by the distal edge 18 of the tailgate 14. Preferably, for protective purposes, a pad 124, such as a rubber pad 124, extends along the tailgate 14 distal edge 18.

In the second positional configuration of FIG. 8, the face elements 84 and 86 extend generally parallel to the tailgate inside surface 24 and upwardly past the tailgate 14 distal edge 18 for stabilizing articles supported by the distal edge 18. This configuration is particularly advantageous for carrying elongated objects which are highly unlikely to fall out against the force of gravity.

A final positional configuration is illustrated in FIG. 9, which is a stowage position. In the FIG. 9 stowage position, the face elements 84 and 86 extend generally parallel to the tailgate 14 inside surface 24 in a direction away from the distal edge 18. Thus, the stabilizing apparatus 30 is in effect retained in position neatly out of the way when not in use, with minimal interference with other uses of the pickup truck. It will be appreciated that the apparatus 30 in the stowage position is contained entirely within the boundaries of the tailgate as defined by the distal edge 18 and the left and right side edges 20 and 22.

In view of the foregoing, it will be appreciated that the stabilizing apparatus 30 of the invention incorporates simple elements in a unique design to facilitate the safe transportation of awkward loads in a pickup truck. Damage to the pickup truck itself is avoided, while effectively stabilizing the load. The stabilizing apparatus 30 folds safely down and out of the way when not in use. Moreover, the stabilizing apparatus of the invention can conveniently be employed in combination with the pickup truck bed 12 and tailgate 14 as a sawhorse/work bench clamp, holding material firmly in place with the weight supported by the tailgate 14 and truck bed 12 when the tailgate 14 is in its horizontal lowered position with the clamping element 80 and 82 extending upwardly and generally perpendicularly to the tailgate inside surface 24.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Apparatus for stabilizing articles in a pickup truck which includes a bed and a hinged tailgate selectably positionable in either a horizontal lowered position or a vertical latched position, the tailgate having a hinged edge adjacent the bed, a distal edge opposite the hinged edge, a pair of side edges, and an inside surface facing the bed when in the vertical latched position and defining an extension of the bed when in the horizontal lowered position, the edges defining boundaries of the tailgate inside surface., said apparatus comprising:

a bar;

a pair of end supports for said bar, each of said end supports mounted to the tailgate against the inside surface thereof adjacent respective side edges and adjacent the distal edge, within the boundaries of the tailgate inside surface, and each of said end supports supporting a respective end of said bar such that said bar extends along the tailgate inside surface in spaced relationship thereto generally between the side edges and within the boundaries of the tailgate inside surface;

an element for detachably securing said bar to said end supports; and a pair of article clamping elements slidably attached to said bar, said article clamping elements including face elements extending generally perpendicularly to said bar and having locking devices for selectively securing said article clamping elements at various positions along said bar.

2. Apparatus in accordance with claim 1, which is selectably configurable in a first position wherein said face elements extend generally perpendicular to the tailgate surface and upwardly for stabilizing articles supported by the bed and by said bar when the tailgate is in its horizontal lowered position, or in a second position wherein said face members extend generally parallel to the tailgate inside surface and upwardly past the tailgate distal edge for stabilizing articles supported by the distal edge when the tailgate is in its vertical latched position.

3. Apparatus in accordance with claim 2, which further is selectably configurable in a stowage position wherein said face elements extend generally parallel to the tailgate inside surface in a direction away from the distal edge.

4. Apparatus in accordance with claim 3, wherein said bar is square in cross section, said article clamping elements are configured so as to prevent rotation about said bar, and said end supports comprise square sockets.

5. Apparatus in accordance with claim 4, wherein said element for detachably securing said bar to said end supports comprises a removable pin received in apertures formed in at least one of said square sockets and the corresponding end of said bar.

6. Apparatus in accordance with claim 5, wherein said bar is repositionable within said square sockets at various rotational orientations with reference to the longitudinal axis of said bar.

7. Apparatus in accordance with claim 6, wherein said at least one of said square sockets and said corresponding end of said bar have apertures positioned for receiving said pin in a plurality of rotational orientations of said bar.

8. Apparatus in accordance with claim 4, wherein said bar is repositionable within said square sockets at various rotational orientations with reference to the longitudinal axis of said bar.

9. Apparatus in accordance with claim 1, wherein said bar is square in cross section, said article clamping elements are configured so as to prevent rotation about said bar, and said end supports comprise square sockets.

10. Apparatus in accordance with claim 9, wherein said element for detachably securing said bar to said end supports comprises a removable pin received in apertures formed in at least one of said square sockets and the corresponding end of said bar.

11. In combination:

a pickup truck including a bed and a hinged tailgate selectably positionable in either a horizontal lowered position or a vertical latched position, the tailgate having a hinged edge adjacent the bed, a distal edge opposite the hinged edge, a pair of side edges, and an inside surface facing said bed when in the vertical latched position and defining an extension of said bed when in the horizontal lowered position, the edges defining boundaries of the tailgate inside surface; and stabilizing apparatus including a bar; a pair of end supports for said bar, each of said end supports mounted to said tailgate against the inside surface thereof adjacent respective side edges and adjacent the distal edge within the boundaries of said tailgate inside surface, and each of said end supports supporting a respective end of said bar such that said bar extends along said tailgate inside surface in spaced relationship thereto generally between the side edges and within the boundaries of said tailgate inside surface; an element for detachably securing said bar to said end supports; and a pair of article clamping elements slidably attached to said bar, said article clamping elements including face elements extending generally perpendicularly to said bar and having locking devices for selectively securing said article clamping elements at various positions along said bar.

12. The combination of claim 11, wherein said stabilizing apparatus is selectably configurable in a first position wherein said face elements extend generally perpendicular to said tailgate surface and upwardly for stabilizing articles supported by said bed and by said bar when the tailgate is in its horizontal lowered position, or in a second position wherein said face members extend generally parallel to the tailgate inside surface and upwardly past said tailgate distal edge for stabilizing articles supported by the distal edge when said tailgate is in its vertical latched position.

13. The combination of claim 12, wherein said stabilizing apparatus further is selectably configurable in a stowage position wherein said face members extend generally parallel to said tailgate inside surface in a direction away from said distal edge.

14. The combination of claim 13, wherein said bar is square in cross section, said article clamping elements are configured so as to prevent rotation about said bar, and said end supports comprise square sockets.

15. The combination of claim 14, wherein said element for detachably securing said bar to said end supports comprises a removable pin received in apertures formed in at least one of said square sockets and the corresponding end of said bar.

* * * * *